May 16, 1939. L. C. WARD 2,158,644
STREET INDICATOR
Filed April 20, 1938 2 Sheets-Sheet 1

Inventor
Langley C. Ward
By

Attorneys.

May 16, 1939.   L. C. WARD   2,158,644
STREET INDICATOR
Filed April 20, 1938   2 Sheets-Sheet 2
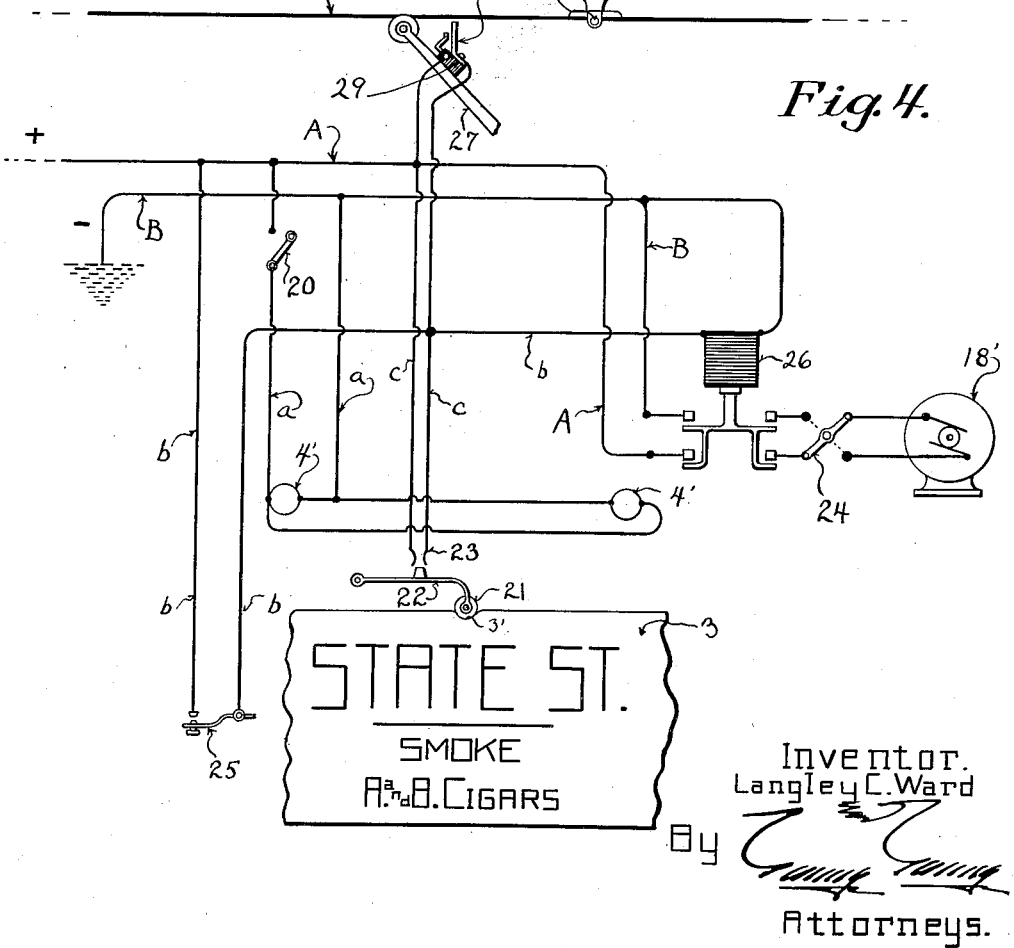
Inventor.
Langley C. Ward
By
Attorneys.

Patented May 16, 1939

2,158,644

UNITED STATES PATENT OFFICE 2,158,644

STREET INDICATOR

Langley C. Ward, Racine, Wis.

Application April 20, 1938, Serial No. 203,213

2 Claims. (Cl. 40—53)

My invention refers to street indicators, and it has for its primary object to provide a simple, economical, and positively actuated street indicator under electric control, the same being applied to any type of vehicle, such as busses, street cars, or the like.

Specific objects of my invention are to provide means for accurately shifting a tape, carrying street names predetermined distances, to display cross street names as the vehicle approaches the same, whereby said names are visible to the occupant of the vehicle; to provide driving means for the tape carrying reels, whereby the same are intermittently moved a predetermined fixed distance to display progressively the names of streets as the vehicle approaches the same; to provide a compensating mechanism for the traveling tape, whereby it is moved an accurate distance with each operation, irrespective of the size of the roll of tape; to provide an automatic circuit breaker associated with the tape whereby an electrically driven motor is accurately stopped as the street name is positioned for visibility; to provide tape-carrying reels having cams or threads for automatically shifting the drive from one shaft to the other incidental to a reverse movement of the motor; to provide gear-actuating means for the shaft which will automatically shift to effect alternate driving connection from one reel to the other without disengaging the gear drive; to provide selective, manual, and automatic circuit make and break mechanism for controlling the driving motor of the tape-carrying reel, one of said make and break mechanisms being actuated by elements associated with the tape edge.

With the above and other minor objects in view, the invention consists in certain peculiarities of construction and combination of parts, as will be hereinafter fully set forth in the accompanying drawings and subsequently claimed.

In the drawings:

Figure 3 is a face view of the indicator housing upon a reduced scale.

Figure 4 is a diagrammatic illustration of the electric wiring mechanism for the various circuits associated with the trolley, motor, and street-indicating tape.

Figure 5 is a plan sectional view of my preferred arrangement of the device.

Figure 1:
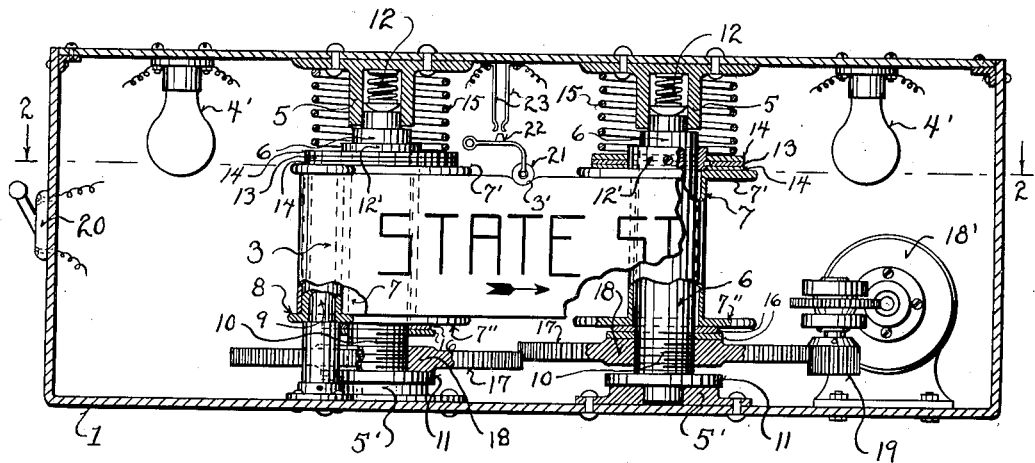
Figure 1 represents a sectional front view of a housing having nested therein street indicator mechanism embodying the features of my invention, the section being indicated by line 1—1 of Figure 2.

Referring more particularly to the drawings, the numeral 1 represents a rectangular case having an opening 2 therein for displaying street names indicated upon a traveling tape 3, it being understood that the opening 2 is closed by a glass panel 4. The case or housing 1 is also provided with electric light bulbs 4'—4', whereby the indicator is properly illuminated.

Figure 2:
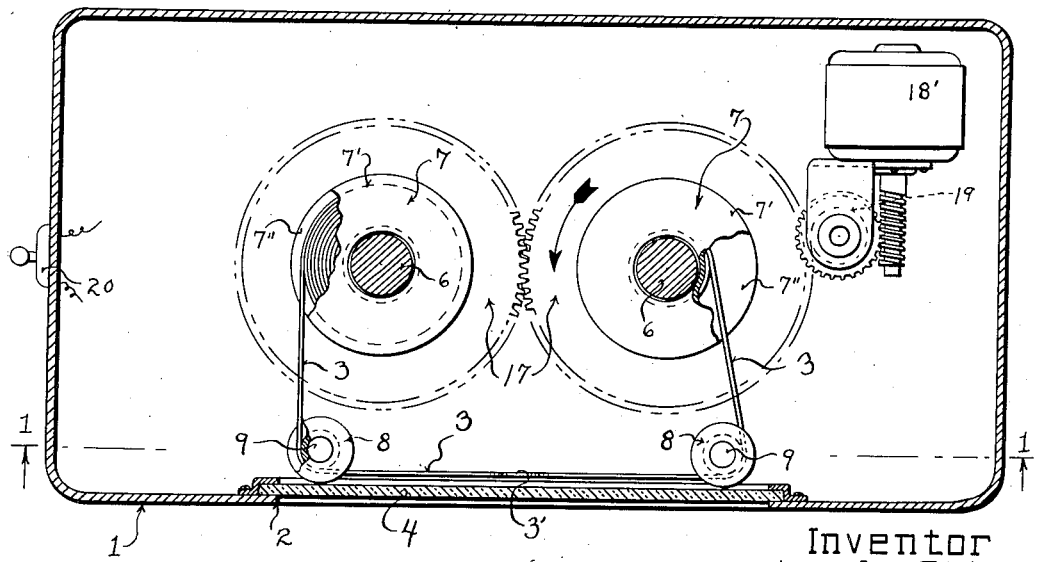
Figure 2 is a plan sectional view of the same, the section being indicated by line 2—2 of Figure 1.
Figure 2:

Mounted in suitable bearings 5—5', carried by the housing, are a pair of shafts 6, upon which shafts are loosely mounted reels 7—7, which have connected thereto the ends of the tape 3. As best shown in Figure 2, the tape, in passing from one reel to the other, is guided by a pair of sheaves 8, which sheaves are loosely mounted upon spindles 9, extending from one wall of the housing, it being understood that the sheaves serve to direct and guide a flat stretch of the tape rearwardly of the glass panel 4, whereby the street names are displayed. One end of each shaft 6 is provided with threads 10, and a thrust collar 11, which frictionally engage the bearings 5', and this frictional engagement is effected by end thrust coil springs 12—12, which springs carry buttons that engage the ends of each shaft, it being understood that these springs are encased in the hollow shaft bearings 5, as illustrated in Figure 1.

Keyed to a collar 12' of each shaft is a friction disc 13, nested between a pair of friction discs 14—14, and one of said last-named discs frictionally engages the flange 7' of each reel 7. Frictional coil springs 15—15 are interposed between the flanges of the bearings 5 and the outer disc 14 of the series previously mentioned. These coil springs, through the gang of discs, exert longitudinal pressure in one direction upon the reels 7, and this end pressure is taken up by a pair of friction discs 16 mounted upon each shaft 6 adjacent to the threaded end thereof, it being understood that one of said friction discs is engaged by the flange 7'' of each reel.

Mounted upon each of the shafts 6 is a gear wheel 17, the hub 18 of which is in threaded union with the threaded portion 10 of the shaft. For example, when the tape is traveling to the right, in the direction of the arrow, the hub 18 of the gear wheel frictionally engages one of the discs 16, whereby said gear wheel is locked to the juxtaposed reel 7, it being understood that the disc 16, which engages the hub of the gear wheel, is held against end-wise movement toward said gear wheel, and, as a matter of fact, this disc is keyed to and revolves with the shaft 6.

Mounted in the housing 1 is an electric motor 18' having a suitable back gear train, which terminates with a pinion 19, which pinion meshes with the associated gear wheel 17. The housing is also provided with a hand-controlled electric switch 20, which is wired to the mechanism, as shown by the diagram.

One edge of the ribbon or tape 3 is provided with a plurality of indentures or notches 3', there being a notch for each street indicia positioned approximately centrally of the same, as best shown in Figure 1. When the tape is at rest, a notch 3' serves as a seat for a roller 21 carried by contact arm 22, which is pivoted to the front wall of the box. The contact arm 22 is arranged to engage a pair of contact springs 23, which springs, in conjunction with the arm, form a circuit make and break switch. While I have illustrated specifically notches in the tape for controlling this circuit mechanism, it is understood that lugs, or other suitable elements, upon the tape may be employed for interrupting the circuit incidental to travel of the ribbon or tape.

It should also be understood that when the circuit of the motor 18' is broken, any suitable positive breaking mechanism or friction device may be employed to prevent overrunning the said motor due to momentum.

From the foregoing description, it is apparent that when the drive gear wheel 17 is rotated in the direction of the arrows upon the tape and the wheel, as is shown in Figure 2, the threaded connection between the wheel 17 and the shaft 6 will cause said wheel, through the various springs and clutch discs, to frictionally engage the reel flange 7'', and due to the fact that said reel is held against further movement or end thrust by the collar 12, the shaft, and all associated parts, will be clutched or locked, and thus moved together to wind the tape, causing it to travel as indicated. Thus, the winding operation will continue until such time as the roller 21 drops into the next notch 3' on the tape edge, whereby the motor current is cut off. When the tape is entirely wound upon its roller, the motor is reversed in its direction of rotation. In this reverse action the wheel 17, which engages the pinion 19, will first rotate upon its end threaded connection 10, until such time as its hub 18 engages the friction disc 11, whereby the friction drive upon the associated reel 7 is released. Incidental to this movement, the driven roll 17, which has been idly driving its associated shaft 6, through engagement of the hub 18 and disc 11, will now free this hub and disc engagement, and travel on its threaded connection to the shaft 6 towards the discs 16, whereby this driven unit will now frictionally lock the associated reel 7 to thus cause re-winding of the tape in the opposite direction from that previously described.

As best illustrated in the diagrammatic view, Figure 4, the motor 18' is reversed by manually operating the switch 24. The light bulbs 4' are supplied with current by manually operating the switch 20 to close a circuit $a$ from a feed wire A and a ground wire B. In order to start the motor in its reverse position, a manually actuated switch 25 is operated to momentarily close a circuit $b$—$b$ in the lines A and B, whereby a contact switch 26 is energized, causing current to travel through the line wire A to the ground wire B. Immediately upon the closing of the switch 25 the tape 3 will start to travel and close the switch elements 22 and 23, whereby current will be constantly maintained through the wire connections $c$—$c$ to the line wires A and B. Thus it will be noted that the switch 25 is manually operated by the driver of the vehicle, to initially close the circuit, whereby the tape is wound a predetermined distance to maintain the closed current, or until such time as the circuit is broken by the make and break mechanisms 21, 22, and 23.

In instances where the street-indicating apparatus is used in connection with electrically driven street-cars, the trolley arm 27, which is electrically fed from the overhead wire 28, may be provided with a make and break mechanism 29, which mechanism is wired in the circuit $c$—$c$. In this instance, an arm or spring 29' will engage a tappet 30 carried by the overhead hanger block, and upon said engagement the current to the motor is closed through the circuit wires $c$—$c$, whereby the apparatus will be automatically actuated to change the name of the streets successively, as the street car travels from one cross-street to the other.

It will be noted that the reels, while being loosely mounted upon their shafts, are held against a tendency to overrun with respect to the idle reel during rotation of the tape to the driven reel.

It is also apparent and an important feature of my invention, that the same may be used extensively for advertising purposes. For example, the tape or ribbon may be made wider for the purpose of receiving different advertisements just above the street names.

Referring to Figure 5, the device is shown in my preferred form, wherein it is compact, and the ribbon or tape extends visible throughout a great length, whereby long names can readily be inserted thereon. The lights and motor are, in this instance, in their preferred positions, and the dimensions are proper for actual reduction to practice.

Also, as shown in the diagrammatic view, Figure 4, the ribbon or tape, it will be noted, is much wider in instances where it is desired to utilize the tape for advertising.

Changes in details may be made without departing from the spirit or the scope of my invention, but what I claim as new is:

1. A changeable exhibitor comprising a pair of rotatable shafts having oppositely threaded ends, tape-carrying reels slidably mounted upon the shafts, constantly meshing gears mounted on the shafts in threaded union with the threaded ends of the shafts and movable toward and away from the reels according to the direction of rotation thereof, a motor having a drive gear constantly meshing with one of the first-mentioned gears, and friction mechanism mounted upon the shafts and interposed between the first-mentioned gears and the reels, whereby the reels are alternately engaged and rotated in opposite directions incidental to reverse movement of one of the first-mentioned gears.

2. A changeable exhibitor comprising a casing, a pair of spaced parallel shafts rotatably mounted in the casing, reels slidably mounted upon the shafts having end hub discs, the shafts at one side of the reels having their ends oppositely threaded, spring-pressed clutch plates mounted upon the shafts and urged toward the hub discs at the ends of the reels remote from the threaded ends of the shafts, constantly meshing gear wheels threaded on the shafts, a motor for driving one of said gear wheels, and clutch discs on the shafts disposed between the gear wheels and the adjacent hub discs of the reels.

LANGLEY C. WARD.